June 9, 1964     S. H. SEIDMAN     3,136,266
LOAD TRANSFER SYSTEM
Filed March 7, 1960     4 Sheets-Sheet 1

INVENTOR.
SOL H. SEIDMAN
BY

June 9, 1964

S. H. SEIDMAN 3,136,266

LOAD TRANSFER SYSTEM

Filed March 7, 1960

INVENTOR.
SOL H. SEIDMAN
BY

FIG.3
FIG.4
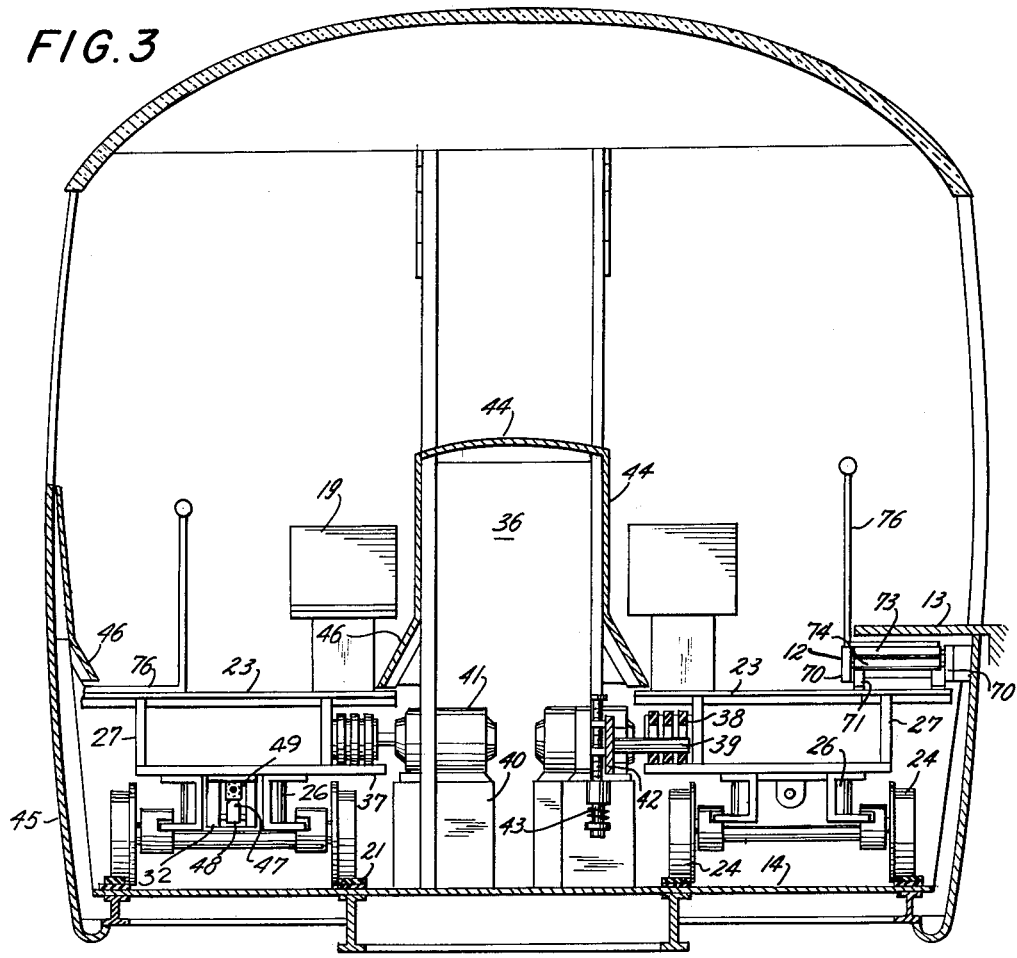
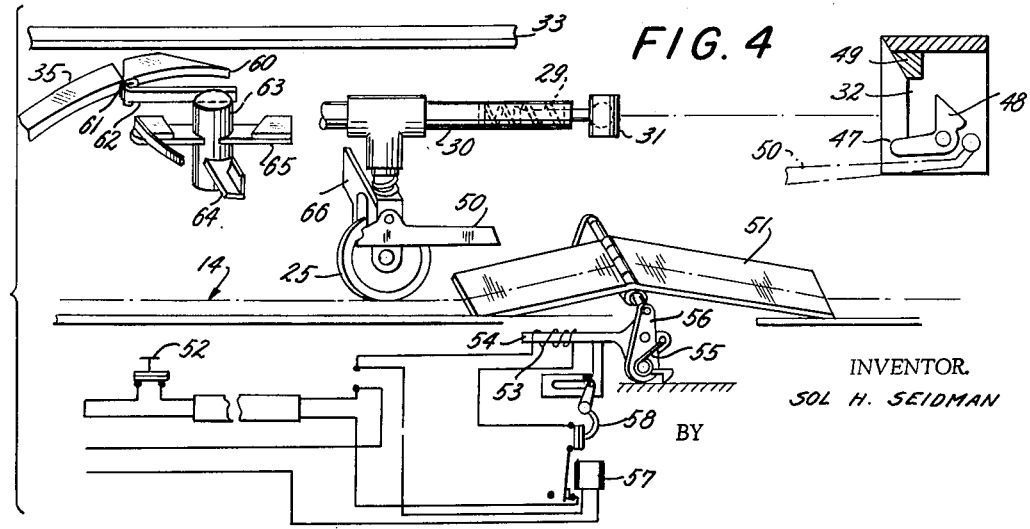

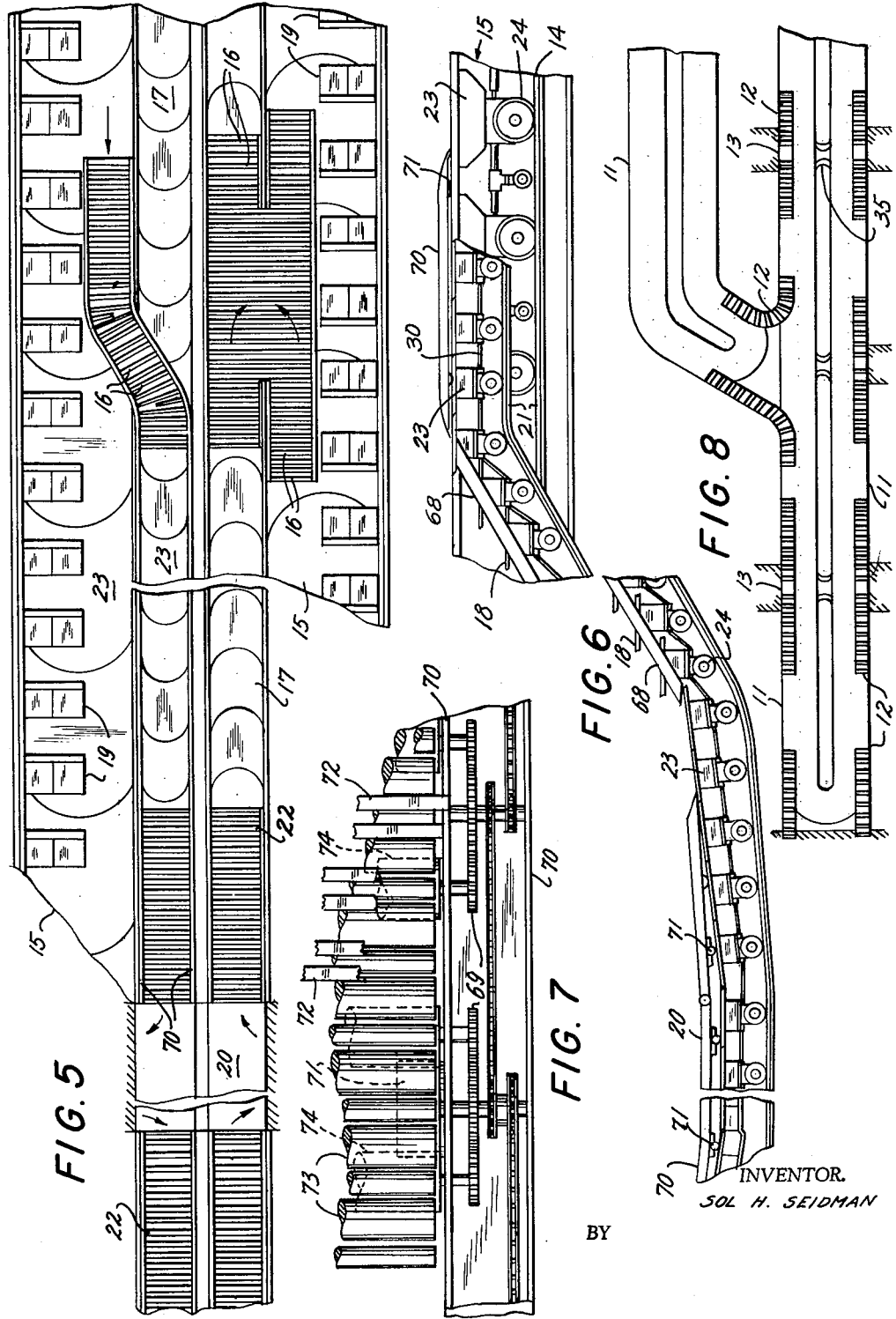

United States Patent Office 3,136,266
Patented June 9, 1964

3,136,266
LOAD TRANSFER SYSTEM
Sol H. Seidman, 51 W. 86th St., Suite Notkin,
New York, N.Y.
Filed Mar. 7, 1960, Ser. No. 13,079
20 Claims. (Cl. 104—18)

This invention relates to load transfer systems for moving people and other load units and more particularly for automated continuous movement of passengers.

The primary purpose of this invention is to provide a novel improvement in high speed transportation that substitutes for the prevailing inefficient or inadequate methods, an improved system of automatic load transfer at variable speed to and from a constant speed conveying device of great length.

Another purpose is to effect constant speed transportation continuously to any exit of individual passenger choice, thereby to avoid subjection of all passengers to intermittent stopping enroute; also to expedite load movement for the same operating speed.

A third purpose is continuity of accommodation along the entire route to greatly increase load capacity per mile of route.

It is desired and a purpose of this invention to provide a low cost, dependable two-way transportation system operative within the width of prevailing single lane batch transportation yet to achieve greatly increased capacity in each direction for any given average speed between any two points of route.

An important object of this invention is to provide fully automated transportation possessing unusual and substantially greater flexibility of movement laterally and vertically and that has broad scope of application, including substantial speed urban and suburban transportation, moderately high speed moving sidewalk and continuous industrial load carrier; also high speed escalation with normal grade travel in combination if desired.

In copending application Serial No. 592,896, of which this is a continuation in part, a new concept in the art of transportation is disclosed. (After the filing of this application, the prior application of Serial No. 592,896 matured into Patent No. 2,936,873.) An endless conveyor is moved continuously at constant high speed past transfer stations along the route of the system, with load transfer to and from the high speed conveyor effected in combination with novel load transfer means which is hereinafter preferably designated by the single word "transveyor." The transveyor comprises essentially a series of conveying elements arranged in tandem and operative at progressively faster or slower speeds for accelerating or retarding load thereon, each end of the series aligned always in the direction of load transfer and one of said ends operatively disposable over a passing conveying surface and in the path of load movement thereon. By means of the conveyor and transveyor, a novel means is made available for transferring load between a continuously fast moving conveying device and way stations along its edge by effecting load transfer automatically always in the direction of load movement. In the new concept is also the novel feature of a conveying device that moves load units in a plurality of lanes therein, with transveyors disposed only in a transfer lane of the device. This leaves the balance of the width as a constant speed lane wherein passengers may travel the entire distance desired to be traversed at high, constant speed, yet by stepping onto the transfer lane as the desired exit is neared, those getting off only are automatically slowed down gradually by the transveyor and landed on the platform extension aligned at the end of the transveyor.

In the copending application, the first three of the aforementioned purposes are fulfilled. However, the foregoing application fails to disclose the invention fully to fulfill other purposes thereof in its broad scope and it lacks important novel improvements necessary for continuously operative automated rapid transit that will efficiently meet the needs of the service. This is partially in consequence of limiting the disclosure to belt drives and belt conveyors.

To attain all listed and other objects of the invention, it is preferred to provide improved embodiment of a conveying surface by means of a novel endless train of interconnected small platforms on wheels, and to provide other improvements that will meet specific objects and features among which are:

First, a transveyor that enables very gradual yet most rapid transveying that is conveniently possible along straight and curved routes. Transveying is herein defined as the act of load transfer at gradually faster or slower speeds as effected on a novel series of conveying elements, an end element of which is operatively disposed over a fast moving conveying surface and the opposite end element of the series aligned for load transfer in the direction of load movement thereon.

Second, short radius movement of every pivotally connected vehicle with wide range of angularity laterally and vertically relative to its adjacent vehicle to attain sharp 180 degree turns of the train within the confines of closely spaced parallel lanes.

Third, automatic longitudinal self-adjustment of slacks, tensions and compressive stresses, if any, that may occur throughout the length of the closed circuit of the train, thereby to minimize interruption of service and reducing servicing.

Fourth, automatic sectionalizing of a single full length endless train into a plurality of endless trains while in operation and vice versa, for converting a series of trains in orbit into trains of different lengths or into the full length train.

Fifth, automatic coupling and uncoupling of interconnected vehicles and automatic rerouting of uncoupled train sections.

Also, important among the objects of the invention is high speed escalation and still more important is escalation at constant speed between any desired levels.

These and other objects and features will be evident from the description of the preferred embodiments of the invention and attached drawings forming part thereof. In the drawings—

FIG. 3 is a cross sectional elevation on line 3—3 in FIG. 1, of typical portions of the system to illustrate their cooperative arrangement.

FIG. 4 is a schematic representation of mechanical and electrical control and actuating means and of electrical circuits therefor.

FIGS. 5 and 6 illustrate in plan and elevation views respectively, another embodiment of passenger load transfer at varying speed with load movement on a continuous conveying surface at nominal grades but with platforms retained level and stepped on inclines beyond normal grade to effect comfortable escalation.

FIG. 7 is an enlarged view of a portion of the transveyor.

FIG. 8 is a schematic representation of two routes with transveyors. The routes are at an angle to each other and curved transveyors between them effect load transfer at or near travel speeds.

Schematically shown also, is the automatic system of rapid transit, comprising a series of transveyors 12 that are aligned in a transfer lane on train 11 for transferring load alternately onto and off moving train 11 in the direction of train movement and for transferring load from and to station 13, also in the direction of load movement.

Figure 1:
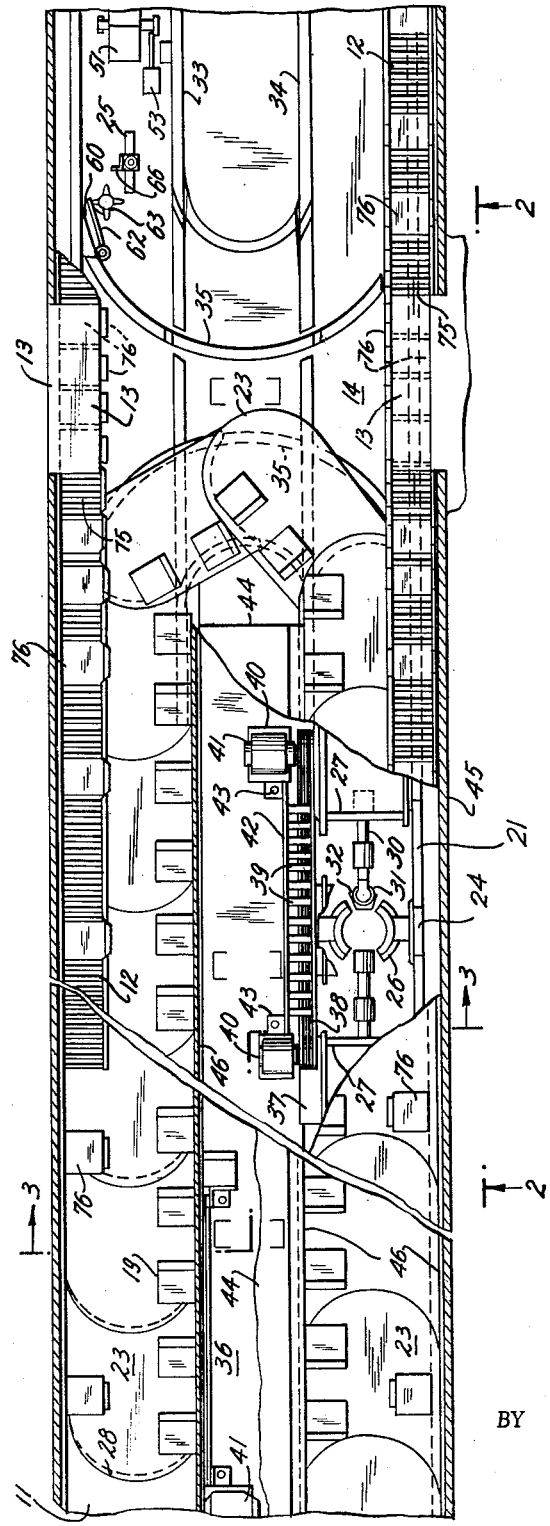
FIG. 1 is a plan view of a passenger train in a stationary enclosure with parts removed to illustrate construction and arrangement of the components.
Figure 2:
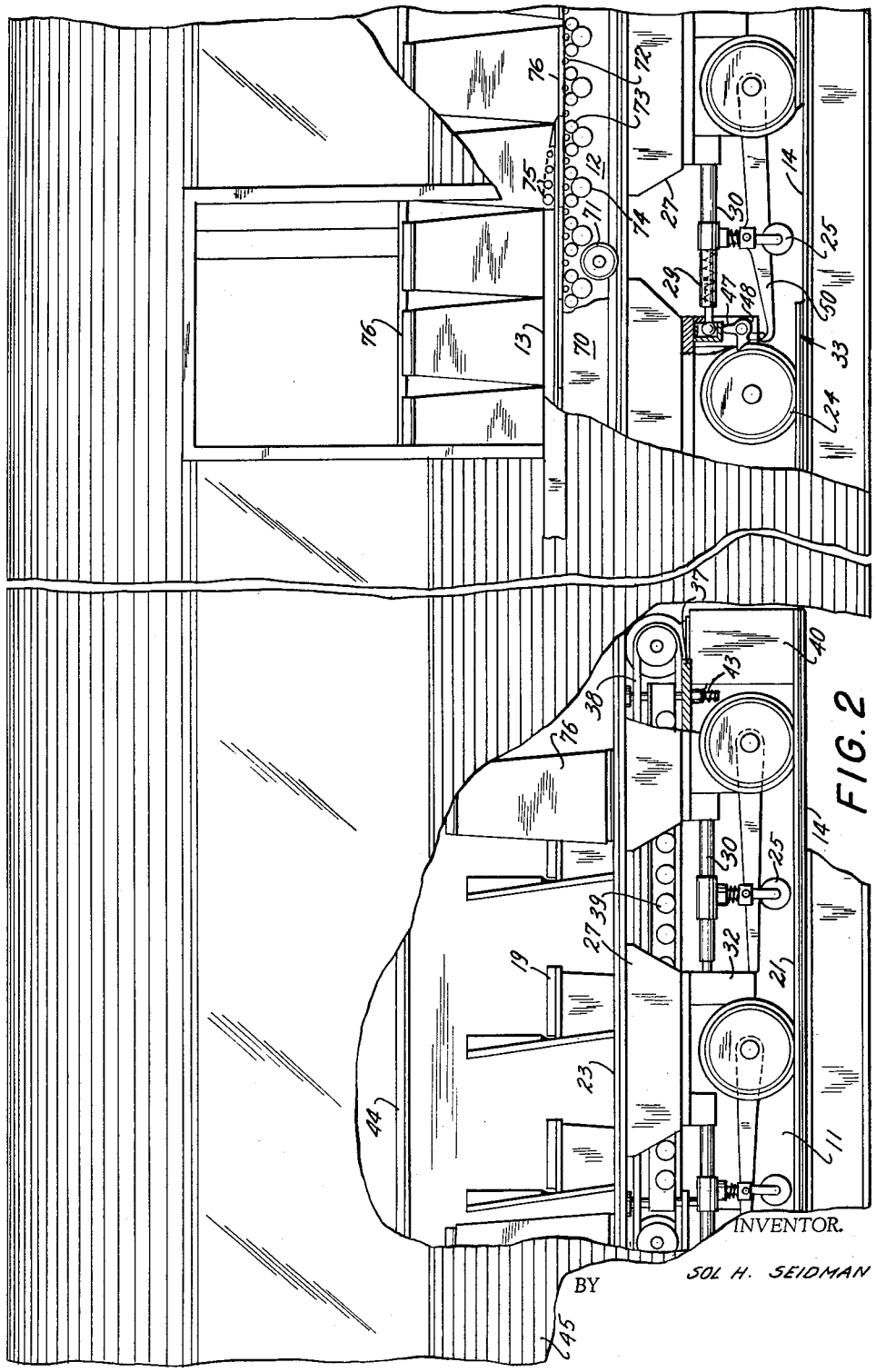
FIG. 2 is a vertical elevation representing to a larger scale a smaller part of this embodiment, also with parts removed.

The preferred construction of embodiments illustrative of the invention in this application includes improvements in the art disclosed in the copending application. A summary description follows:

In FIGS. 1, 2 and 3, a continuous conveying surface is formed by a novel endless train 11 of cars 23. For continuity of operation, train 11 preferably orbits in a closed circuit route and load transfer devices such as transveyors 12 transfer load units between the entrance/exit platforms 13 and the constant speed train 11. The transveyors 12 and the platforms 13 are preferably narrower than the train, particularly for long routes, and preferably aligned so that the same part of the width of the train passes operatively proximate under platforms 13 and transveyors 12, such part of the width thereby constituting a transfer lane on the train.

By this arrangement of the elements on the structure, load units such as passengers, landing on the slow speed end of the entrance transveyor 12 from platform 13, are accelerated toward train 11 and transferred onto the train at small speed differential. Load units staying in the transfer lane, are automatically transferred onto the next exit transveyor. However, by switching from the transfer lane, passengers may ride continuously at constant speed on seats 19 in the unobstructed lane until ready for exit at the desired station.

A modification of the above load transfer system is illustrated in FIGS. 5 and 6. Herein is shown a similar but elevated train 15 moving perhaps also in a long closed circuit route. Transveyors 16 forming S- or H-curves, as further explained later, enable load transfer between the high speed train 15 and the upper level of a moderate speed escalating train 17. The train 17 is a balanced train of cars moving in a closed circuit route which in this case includes:

(a) Oppositely directed parallel lanes at the upper level just below the elevation of transveyors 16 and at a lower level just below platform 20 and transveyors 22;

(b) Continuing lanes on incline between the two levels for ascent and descent of cars 23, with the cars retained upright while on the inclines to form escalator treads 18 as will be further explained later and (c) A looped portion at each end of train 17 (not shown in these views but similar to loop 35 in FIG. 1).

In the modified system disclosed, train 17 and transveyor 22 are relatively narrow and both of its oppositely directed routes are within the space between the parallel routes of the high speed train 15 which have seats 19 alongside the transfer lanes. By virtue of the novel arrangement of the elements in combination, transfer of load units after their landing from platform 20 onto transveyor 22 is completely automatic and effected to speeds of small differential during acceleration (or retardation) on transveyor 22, transfer to/from train 17, ascent (descent), transfer to transveyor 16, acceleration (retardation) thereon and transfer onto and off the high speed train 15.

A more specific description of the invention follows:

The cars of train 11 in the preferred embodiment comprise platform cars 23 of high width to length ratio having single, axle trucks 24 approximately central thereof. Each platform car 23 has a frame 27 on a swivel mounting 26, a coupling 32 off center forward of truck 24 and a connecting link 30 that extends rearwardly considerably beyond the rear end of platform 23. As illustrated, the cars are pivotally interconnected near center lengthwise as the terminal coupler 31 of connecting member 30 is engaged by coupling 32. This construction enables maximum angular displacement between adjacent cars for the smallest practical turning radius of train 11. It is preferred also that the end edges 28 of each of platforms 23 be beveled and curved to approximately equal radii of curvature centered at or near the pivot line and that the forward convex edge of each platform overlap the rear concave edge of the adjacent platform. By virtue of this construction, the relative position of the edges remains substantially uniform to maintain a continuous conveying surface.

While each car 23 is preferably in the form of a two wheeled cart when interconnected to form train 11, the additional wheel support 25 being held elevated off roadway 14, the wheel 25 is resiliently mounted on connecting member 30 for maintaining platform 23 substantially level and stable and with terminal 31 of connecting member 30 in engageable position when the cars are uncoupled. The unusual useful value of such construction will be evident further subsequently.

Provision of importance is also made for sufficient yield longitudinally to take up any temporary stresses, both of compression and tension, that may accumulate along the long route of the moving train. To that end, the coupling portion of link member 30 that terminates in the ball joint 31, is mounted to telescope with the body of connecting member 30 against the action of a spring 29 which retains the coupling portion resiliently in both longitudinal directions of telescoping. Thus, between every vehicle 23 and its adjacent car, a limited tolerance of movement is provided with resilience to prevent jerking or jamming. Most important, self adjustment is assured because the give is cumulative and the endless train, moving at generally constant speed, inherently tends to be balanced, with compressions in one portion counterbalanced by tensile stresses in another that tend toward self-adjustment.

From the foregoing it is evident that a highly flexible and longitudinally self-adjusting conveying medium is created in the form of an endless train of two wheeled vehicles of simple, inexpensive construction. The train 11 illustrated herein, is intended to move in a closed circuit in a generally counterclockwise direction with every pair of flanged wheels riding on a track 33 in one direction and on track 34 in the opposite direction, loop tracks 35 at the ends constituting interconnections between the two ways 33 and 34 to complete the circuit. The space between the two ways is preferably of minimal practical width and is a convenient service area 36 when the two ways are closely spaced as shown in the embodiments illustrated. This construction enables continuous conveying by a single full length train moving in circuit along the ways of a long route in balanced, self-adjusting manner, without the need of expensive equipment for braking and acceleration under load.

Because the conveying means described is intended to be operated at substantially constant speed and because loading thereon is distributed and without great local concentrations, the relatively small cars 23 need be relatively light. These factors result in light wheel load concentrations, hence small tractive force requirements, and enable avoidance of self-propelling equipment, third rail power take-off, etc. This enables substitution for tracks of conventional steel rails, of rubber treads of a section similar to conventional automobile tires mounted for replaceability on bars of moderate length and the resulting rubber rails 21 suitably set on roadway 14 for railroad operation that offers quiet and comfort.

The preferred means of activating the train includes belt drives 38, the underside of the belts in frictional contact with the traction members 37 for driving same and a gang of rollers 39 for each belt drive, operative as a unit under adjustable pressure against the belts that are in contact with the brackets 37. In the belt drives herein illustrated a plurality of V-belts, preferably extend in active length to contact at least two traction brackets 37, with sheaves at each end supported from pedestals 40 in the service space 36, and the forward sheave driven by a motor 41. The rollers 39 are preferably mounted on one beam 42 which moves in vertical guides on pedestals 40 against compression springs 43 that are suitably adjustable for desired pressure of the gang of rollers 39. The pressure requirements are very low and never critical since the power demand for constant speed pull is relatively low and the area of surface subjected to tractive contact is large. The requirements of pressure adjustment depend largely on location of drives along the route and the number of trailing vehicles subject to the tractive pull of the drives, so that this adjustment is effected initially and requires little if any attention as a maintenance factor. The effectiveness of the drives in motivating every vehicle in succession is obviously positive at all times and permits flexibility in the positioning of the drives wherever indicated to be most effective in maintaining the desired speed of the system, such as close spacing on upgrades, etc. as well as in the size of the motor drive to meet the needs of the particular location or portion of the train.

The aforementioned efficiency and effectiveness of the device described herein for driving conveying means is useful improvement and believed to be novel over application of rotative power directly or over movement by pushing the rear of a train of vehicles or pulling at the forward part thereof because the motivating force is applied externally, such as from the side of a train to every vehicle in succession by suitable adjustable tractive pressure.

Association of the flexible, resiliently self-adjusting, endless train of vehicles with the guiding tracks and external drives that are described herein, provides a self-guiding conveying medium of great versatility of movement and broad scope of application. In order that the cooperative relationship of components and continuity of correct functioning be maintained, a roadway 14 having suitable structural sub-framing (see FIG. 3) supports the two lanes of the train, the tracks and drives and combines with sides to form enclosure 45. On the sides are stringers 46 which extend over the outer side edges of the platforms of the vehicles 23 to prevent their vertical displacement.

Completing enclosure 45 is a suitable structurally supported cover 44 for the service space 36. This also has stringers 46, preferably removable and extending over the inner edges of the vehicle platforms 23. The novel improvement created thereby provides not only a protective enclosure against weather and foreign elements interfering with operation, but also provides for the long train of light vehicles a vertical guiding means that eliminates possibility of derailing or of telescoping of cars by confining the train movement on a three dimensional basis, besides protecting passengers against all risks of underflooring contingencies of operation.

As mentioned hereinabove, tracks 33 and 34 are continuous for the entire length of the route with loop tracks 35 at the ends completing the circuit for a single full length train. Many practical considerations and the need of meeting contingencies require that the full length train be capable of being temporarily sectionalized into a plurality of trains moving in closed circuits. Such sectionalization is not practically attainable with belt drives but is readily achieved in combination with the embodiment herein described. At suitably spaced intervals along tracks 33 and 34, intermediate loop tracks 35, each with pivotal rail switch 60, are provided whereby sections of the full length train may be turned into the oppositely directed track. These sections of interconnected vehicles 23 then form independent units as illustrated in FIG. 1, any of which may stand still while others move within smaller circuits all within the confines of the original route.

Uncoupling and coupling of the train sections, also the selection of route by the train sections when uncoupled, are effected automatically in the preferred embodiment of this invention, as follows (see FIG. 4):

Connector 30 on which wheel 25 is mounted, extends from frame 27 of car 23 and its end portion forming coupler 31 is spherical and preferably set in a cylindrical race. The position (see FIG. 4) of the coupler 31 when uncoupled and with the supporting wheel 25 riding on the roadway, is preferably in alignment with a point slightly above the pivot shaft of a rocker arm 48 in receptacle or coupling 32 of the adjoining vehicle. The alignment need not be critical either vertically or horizontally, since receptacle 32 has guiding surfaces flaring out from the rocker arm 48 and the mounting for wheel 25 is preferably variable in length to permit reasonable adjustment of the elevation of the coupler 31. When in position for coupling, the counterweight part of rocker arm 48 is substantially vertical and its center of gravity is preferably forward of the axis of the pivot shaft, while cam 47 of the rocker arm extends horizontally forward slightly below the axis of the pivot shaft. As the rear vehicle overtakes the car ahead, first contact is between the race of coupler 31 of the car ahead and the face of the rocker arm counterweight 48 of the approaching vehicle, followed by angular displacement of the rocker arm 48 and consequent movement of the center of gravity rearwardly of the axis of the pivot shaft. This increases the counterweight factor while rotating cam 47 so that it raises coupler 31 during its movement into the receptacle 32 until the cam 47 assumes a stable, substantially vertical position and the race of coupler 31 is behind the retaining lip 49. This completes the coupling operation, for the race of coupler 31 is supported against vertical displacement by the counterweighted cam 47 and against lateral uncoupling by fixed lip 49, and is held in the raised position whereby wheel 25 on the same link 30 is raised off the roadway as required.

The uncoupling is effected by raising the rocker arm counterweight 48 so that it rotates about its pivot together with cam 47. As cam 47 rotates into horizontal position and the counterweighted arm 48 moves into vertical position, coupling member 31 is urged out of receptacle 32 free of support, and wheel 25 is lowered back with its link 30, onto the roadway as its support. For full automatic uncoupling, rocker arm 48 is raised by a short upward movement of the free end of a lever 50 which is pivoted at its opposite end and has intermediate support at wheel 25 nearly midway between the ends. Thus, an even shorter upward movement of wheel 25 against its resilient mounting while the link 30 is held in fixed position when coupled, results in the desired upward movement of lever 50 and hence of rocker arm 48. For effecting the upward movement of wheel 25, a hinged two-way ramp 51 is in the center part of each route 33 and 34 a reasonable distance from each loop track 35 so as to be in the path of wheels 25 for the uncoupling operation when in raised position and out of possible contact with the wheels otherwise. The automatic uncoupling of any interconnected cars in the train, as described, needs merely the actuation of a remote control push button switch for its initiation and completion, the embodiments and sequence of operation being by way of example, as follows:

Closing of a switch 52 energizes solenoid 53 to draw core 54 inwardly against the action of a spring 55. By pin connection of core 54 with camshaft 56, rotation of cam 56 is effected from a horizontal or low position to vertical elevated position raising ramp 51. Near the end of the movement of core 54 inwardly of solenoid 53, moving contact is made with a follower end pin of switch 58, also in the solenoid 53 circuit. Thus, pursuant to consequent slight time lag after activation of solenoid 53, the energizing of the solenoid 53 ceases, core 54 is drawn out by the actuation of spring 55 and that also causes switch 58 to move back into closed position. The energizing of solenoid 53 is thus momentarily yet sufficiently long for one wheel 25 to ride ramp 51 while it is raised by cam 56, thereby causing lever 50 to actuate rocker arm 48 for uncoupling the vehicles. After the momentary energizing of the solenoid 53, spring 55, in drawing core 54, also effects rotation of camshaft 56 into horizontal low position of its cam and lowering ramp 51. Two relays 57 in tracks 33, 34 are interconnected and one is in each solenoid 53 circuit, thereby interlocking these circuits for simultaneous energization of the two solenoids or neither. Thus simultaneous uncoupling is effected at the two points insuring equally simultaneous timing for rerouting of sections.

Coupling and uncoupling of any cars 23 in a train have been shown to be effected automatically with positive functioning of simply arranged elements.

For automatic rerouting of the severed train sections, utilization is made again of the supporting wheel 25 as an actuating means and of the factor that wheel 25 is operative on the roadway when link 30 is uncoupled and is in elevated disposition when the vehicles are coupled, for selection of the route. In this embodiment, the rail switch 60 on intermediate loop track 35 is movably connected to its rail by a pivotal connection 61 with a spring having an arm 62 thereon urging the switch 60 to be normally away from the rail portion of track 33, 34. In this position, the resilient arm 62 abuts a vertical support of a rotatable actuator 63 on which are mounted cross bars 64 and 65, displaced 90 degrees from each other, with a cam follower at each end of each cross bar, and bar 65 being at a higher elevation than bar 64. While one such rail actuator 63 is operatively disposed near rail switch 60 in the zone of curvature of every loop track 35, its disposition is also near the center line between the rails of the main tracks 33, 34, so that the cam followers on bars 64 and 65 may be actuated by a cam 66 protruding from the supporting member of wheel 25, as it moves along this center line.

Thus, should temporary isolation of any train portion be required without interrupting operation of the remaining portion of the train, the controlling attendant of the system would actuate preferably four push button switches 52 that correspond to the two reverse directing tracks 35 at each end of the train section about to be isolated, for uncoupling of the train at four points. This causes one freed link 30 to trail each section and one freed car 23 to head an approaching section at each of the four curved tracks 35. In every instance, the corresponding wheel 25 of each freed connector 30 then rides the roadway along the center line between the rails of tracks 33, 34 and approaches the rail switch actuator 63. The cam follower on the lower cross bar 64 is at this stage in the path of cam 66 on the roadway riding wheel 25 of the trailing vehicle. As the cam and follower are moved in contacting relation, the cross bars 64, 65 are rotated through a 90 degree angle. Simultaneously, the end of upper bar 65 moves spring arm 62 to effect closing of rail switch 60 against the outer rail of tracks 33, 34. By the time the actuating wheel 25 of the trailing vehicle has passed the actuator 63, the upper cross bar 65 has one end against spring arm 62 and the opposite end with its follower in position for cam 66 of wheel 25 in elevated disposition. The wheel 24 of the head vehicle following the above trailing wheel 25, is then urged onto the curved rail end 60 and this head vehicle of the new section now moves onto track 35 at each of the four points of uncoupling. As this head vehicle with its coupled rearward link 30 and elevated wheel 25 passes the rail switch actuator 63, the raised cam 66 contacts the follower on the upper bar 65 and rotates the actuator 63 another 90 degrees. The end of bar 65 that is against the spring arm 62 is an arc that extends through this 90 degree movement to maintain contact with arm 62 and keep rail switch 60 closed. But now that the follower of lower cross bar 64 becomes disposed below the path of the cams 66 of the following interconnected vehicles, there is no further actuation of the cross bars and each new train section moves in its new route over the intermediate loop track 35. Upon completion of their trip on track 35, the head vehicle of each of the four severed sections moves onto the oppositely directed main track and each joins the trailing vehicle on this oppositely directed track just as this vehicle has completed its movement on the main track 33, 34 past the zone of the curved pair of tracks 35.

The four new coupling operations produce three train sections which now move in smaller circuits than the original full length train. Power may be shut off from the now isolated center train section, if that is desirable to stop its operation while the operation of the remaining two sections remains undisturbed. When repairs or other reason for isolation is removed and restoration of single full length train operation is deemed desirable, another actuation of the same four electric switches 52 effects uncoupling of the train sections at the same four points. Then the follower on the lower cross bar 64 is contacted by the now lower cam 66 of roadway riding wheel 25 of uncoupled trailing link 30. This effects rotation of actuator 63 through another 90 degrees, terminates contact of end of cross bar 65 with spring arm 62 which causes rail switch 60 to move out of contact with rail 33, 34. As the head car of each severed section passes the actuator 63, the raised cam 66 on the first wheel 25 contacts the follower on cross arm 65 and rotates it the last 90 degrees of its full turn, setting lower level bar 64 and its follower out of the path of the next raised interconnected wheels 25. It should be noted that if more than one vehicle should be accidentally uncoupled, then this second vehicle nevertheless follows the route set by the preceding cam 66, but it cannot affect the setting of the cross bars in view of the alternately raised and lowered bars. Of course, with rail switch 60 open, the head car of each following severed section cannot move onto the loop track 35 and instead remains on the main track 33, 34 to join the trailing link of the vehicle that had completed its trip on the loop track 35, whereby the full length train is restored.

The earlier brief description of the novelty and attainments of the escalating train 17, etc. illustrates the versatility of the endless train of cars on wheels and the improvements achieved thereby cannot be accomplished by other means including the belt construction in the copending application.

This train 17 preferably of smaller cars 23, attains the facility of movement both horizontally and with substantial vertical components depending upon the vehicle height and width factors by virtue of the following embodiments. First, pivotal connections are provided at both ends of link members 30 to enable the alternate stepped ascent and descent in this embodiment. Secondly, conventional inclined stringers 68 are provided, engagement of the upper and lower edges of which retain the cars in vertical disposition as their wheels 24 ride their inclined tracks 33, 34. Because of the freedom of limited longitudinal movement within link 30, the vehicles are capable of separation beyond the range of the lap and are thus freed to move past each other in either direction. The separation is effected automatically by the increased weight component when the sharp incline is reached by the moving vehicle ahead. It is preferred that a plurality of oversized drives be disposed only at the upper level after the escalator has completed its ascent. For while attainments of the invention are not limited to train movement alternating between normal grade and as escalator, such alternation when embodied for both descent and ascent, results in a balanced and stable device that requires minimum power for operating the system and that is limited to overcoming only friction and differential of payload over balance. Most important, however, is that by means of this invention, escalation is effected at high speed, the transveying being performed on normal grade. Moreover, if transveying is in only part of the width, with a lane provided for continuous movement, escalation is effected at constant high speed between any desired levels. This compares with the slow and inconvenient method prevailing at each floor or even with the faster elevators which require all passengers to be subjected to the delay and inconvenience of intermediate stops. The route of an escalating train may vary widely such as in a spiral. Also, transveyor transfer points may be at any part of the route deemed desirable.

The transveyors 12, 16 and 22 in the embodiments herein also avoid the limitations inherent in belt conveyors. The preferred construction includes the following:

Across the top of a pair of structural stringers 70 supported preferably on wheels 71 which ride a conveying surface such as is formed by the interconnected train of cars 23, is a fixed grating 72 of slotted plates or a series of parallel spaced structural shapes. Alternating preferably with small diameter idler rollers, larger activated rollers 73 protrude through the spaces at slightly raised uniform level above the grating 72. This results in a substantially uniform platform surface suitable as a pedestrian walkway. Rollers 73 are retained resiliently in operative contact with live rollers 74 which are driven by gearing 69 mounted on the stringers 70 and powered by the rotating wheels 71 (see FIG. 7). Every few rollers 74 and therefore rollers 73 are rotated progressively at a different speed at small speed differential, thereby accelerating or retarding load on the rollers 73 very gradually. The resulting transveyor construction gives the impression of complete standstill as well as stability because of the crosswise positioning of the slight protrusions of the rotating rollers and actually does provide uniformity of surface and sturdy support throughout its length despite variations in the speed. Because the rollers 73 are spring retained, risk of damage or jamming of any roller is greatly reduced and would produce negligible effect in operation. Repair or replacement is minor. The roller transveyor has the great advantage of being arrangeable in desirable curvilinear shapes such as S-shape or H-shape for load transfer between parallel trains of different speeds as well as of the same speed.

While the transveyor described is believed to be adequate for most purposes and applications, a novel improved arrangement for transveying has added features of advantage that is preferred for many types of operation particularly for a public that includes infirm and timid people. The novel arrangement is clearly evident from FIGS. 1 and 2.

Abutting the end of station platform extension 13 is a transveyor 75 of short length, that is activated by gearing of transveyor 12. By means of transveyor 75, the speed of load is gradually adjusted between small limits, say between one foot per second and five feet per second, the higher speed being the preferred minimum speed of transveyor 12. Rider guides 76 are moved by the transveyor 12 in adjoining disposition thereon beneath both the stationary extension 13 and the transveyor 75. The rider guide 76 is essentially a base or frame with a railing at one side. Its functions are to enable one or several passengers to stand within its area, as on a conventional step of an escalator, during the period of the passenger's acceleration or retardation; to facilitate automatic transfer from platform 13 to transveyors 75 and 12 or from the train and, as will be shown, it automatically times arrivals of load units from the train onto the transveyor to minimize chance of crowding during retardation. Finally, the transveyor 75 in combination with the rider guides 76 enables faster loading and unloading of the high speed train as follows:

Because the rider guides 76 are in adjoining disposition while moving along platform 13 and transveyor 75, their railings form a continuous moving fence along the edge of the station extension 13 and of the transveyor 75 and their movement is at a good walking pace. Thus, by taking hold of the railing, even a slow moving or hesitant passenger on platform 13 is aided and guided by the hand and urged forward to make the transfer onto the transveyor 75 and then automatically onto the rider guide 76 unhesitatingly and at reasonably fast but safe pace. Since the initial slow speed of the rider guide 76 is achieved by means of auxiliary transveyors 75 at a higher speed than that for transition required from standstill, the time of acceleration of the rider guide 76 to its maximum or train speed, is less. Also, as guides 76 are accelerated, their distance apart is increased, but by virtue of the smaller differential between train speed and the higher minimum of the guides 76 when combined with transveyor 75, the final distance between them is relatively less, which enables more passengers to board or leave the train per unit of time. Therefore, the dual transveyor method (transveyors 12 and 75) has important advantages over the single transveyor method. The rider guides 76 serve another important function by virtue of their predetermined maximum spacing while on the train. In the copending application, the need was emphasized of controlling arrival of passengers at the transveyors for retardation in small groups to prevent possibility of their crowding during retardation. After the guides 76 have served their functions of safe guidance and aid for reasonably fast load transfer during acceleration, they are generally left vacant while passengers travel in the preferred constant speed travel lane of the train to their desired destination. The vacant guides 76 move with the train in their final full speed spacing and each is ready to receive the one or few passengers for movement toward the next retarding transveyor 12. Since they are in the automatic spaced relation effected during their acceleration from adjoining relationship, they are at proper distance and the distance between them is reduced gradually during the retardation so that by the time the rider guides 76 are adjoining, the passengers are at the short transveyor 75 from which they are a single step onto the platform 13 but aided by the faster moving railing to expedite their movement and relieve any tendency to hesitate or slow down at the exit.

In summation, set forth hereinabove are preferred embodiments of novel construction. These embodiments comprise simple mass producible elements that have been herein shown assembled in novel combination for cooperative functioning. The load transfer systems created attain substantial improvement over, yet meet the requirements of prevailing methods of load movement in such fields of transportation as railroad, urban transit, belt conveyor, escalator, elevator etc. The improvements are attained by means of devices for effecting continuous load transfer at variable speed—more particularly, that is progressively and gradually accelerating or retarding—disposed operatively proximate over a high speed conveyance for load transfer therebetween automatically. As disclosed, such system is capable of substantial vertical component as well as horizontal load movement and of load transfer at variable speed shared with continuous constant speed movement of load. While much of the above is common with an earlier application as noted, the features attained herein by the novel transveyor and wheeled conveying means combine to create an improved load transfer system that is totally self contained and fully automated and as such is inherently practical, simple and fully safeguarded for public use.

The novel features of the invention evident from the disclosure herein not only attain the listed objects of the invention, but include many important features not so listed.

The foregoing description including the drawing forming part thereof is intended merely to illustrate by way of example suitable embodiments of the invention, that

I claim:

1. A load transfer system including a conveyor and alternate loading and unloading transveyors, said conveyor underrunning said transveyors, said transveyors having means of transferring load thereon at varying speeds to and from said conveyor and, in continuous succession, automatically onto and off said conveyor intermediate said loading and unloading transveyors, the transveyors being considerably narrower than said conveyor, overlying a part of the width of said conveyor and forming a load transfer lane including said transveyors and a load transport lane spaced laterally thereof.

2. In a load transfer system, a flexible, endless conveying surface, within the width thereof a constant speed transport lane and a variable speed transfer lane spaced laterally thereof, successive loading and unloading transveyors overlying a part of the width of said conveying surface forming said transfer lane, means of accelerating or retarding load on said transveyors to or from the speed of said conveying surface and means of transferring load automatically onto and off said conveying surface, said transport lane comprising means of load travel express between any loading transveyor and any unloading transveyor as selected.

3. A load transfer system comprising a transporting medium, a series of alternate loading and unloading transveying devices having accelerators and retarders of load operative to or from said transporting medium, said medium underrunning said transveying devices and means of transferring load automatically on said transveying devices and, in continuous succession, onto and off said transporting medium intermediate said loading and unloading transveying devices.

4. In a transportation route having transfer platforms, a transport medium with a conveying surface movable past said transfer platforms and transveyors overlying part of the width of said conveying surface and comprising load transfer elements, drives actuating said elements for acceleration or retardation of load thereon and means of retaining said transveyors in operative communication between said transfer platforms.

5. A load transfer system of continuous rapid transit comprising an endless train of interconnected platform cars forming a resilient, flexible conveying surface, driving means for continuous movement of said train and accelerating or retarding load transfer devices retained between transfer platforms in the route of said train and said conveying surface underrunning said transfer devices and means on said transfer devices of transferring load onto and off said train of platform cars from and to successive transfer platforms.

6. In a load transfer system having spaced loading and unloading transveyors, a train of platform cars, connectors thereof having yielding resilient means, said train underrunning said transveyors, said transveyor having means of transferring load thereon automatically at varying speeds and onto and off said train and driving means comprising a series of drive units having drive members operative simultaneously on the same side of said train of cars, each of said cars in succession, yielding resiliently, thereby effecting movement of said train of cars.

7. In apparatus for continuous transit of passengers and other load, a series of loading and unloading transveyors, a flexible transport medium having an endless conveying surface underrunning said loading and unloading transveyors in alternate succession in part of the greater width of said conveying surface, and means of transferring load automatically at varying speeds on said transveyors and onto and off said transport medium, the portion of the width thereof spaced laterally of said transveyors forming a transit lane having load accommodation for continuous express transport of load between any loading and any unloading transveyors selected.

8. In apparatus for continuous movement of load between transfer platforms in a closed circuit route, an endless conveyor movable at constant speed, and speed varying loading and unloading transveyors communicative with said transfer platforms, a part of the greater width of said conveyor underrunning said transveyors having means of transferring load at variable speed on said transveyors and onto and off said conveyor, the improvement residing in a series of rider guides movable on said transveyors along said transfer platforms for setting pace of load thereon, said series of rider guides distributed also on other part of said transveyors and on said conveyor, serving to guide load automatically toward and onto said conveyor, then onto said unloading transveyors.

9. In apparatus of continuous movement of load between transfer platforms in a transportation route, loading and unloading transveyors communicative with said transfer platforms, a transport medium, part of the greater width thereof underrunning said transveyors having means of transferring load thereon automatically at gradually varying speeds then onto and off said transport medium between successive platforms, the improvement in said transport medium comprising a train of connected platform cars and drives therefor, the platforms of said cars forming a flexible conveyor, the connectors on said cars having longitudinally yielding resilient means, and said train movable in a closed circuit route as a pair of oppositely directed parallel sections looped at the ends thereof; the further improvement comprising a series of drives operative from the space between said sections, each of said drives having means of moving each of said platform cars in succession under adjustable frictional pressure applied thereto, the series of drives serving to move said parallel sections of the train in opposite directions simultaneously.

10. In a transportation system of the class described including a train of cars and driving means therefor, the improvement in driving means comprising an individually powered drive unit operative at one side of said cars, a drive member actuated by said drive unit and having an outwardly disposed surface operative from said side in frictional contact with a surface of each of said cars movable in succession and a pressure applying device with means of adjusting pressure applicable to the portion of said drive member in contact with said car surface, said drive unit and other similar drive units operative simultaneously from the same side of said train of cars, serving to effect movement thereof as a unit.

11. In a load transfer system including loading and unloading transveyors spaced in a route, a train of platform cars underrunning said transveyors having means of transferring load automatically onto and off said train at the speed thereof, the improvement in said train of cars residing in said car platforms forming a continuous, uniform surface of a substantial flexibility, pivotal interconnections being near wheeled support of said cars, and car connectors having longitudinally yielding resilient means.

12. In a load transfer system having a train of platform cars underrunning loading and unloading transveyors with means of automatic load transfer therebetween, the improvement of each car of the train comprising a platform, wheeled support therefor, a coupler near said support lengthwise of said car, a connecting member extending oppositely from said coupler, a pivotal terminal coupler of said connecting member engageable by the coupler on an adjacent car, and longitudinally yielding resilient means on said connecting member reactive to changes in spacings between adjacent cars.

13. In a load transfer system including a transporting conveyor underrunning loading and unloading transfer devices having means of varying speed of load thereon, the improvement residing in each of said transfer devices adapted to ride in place on said conveyor, having a platform walkway with framing on wheels, transverse rollers journalled side by side on said framing between the ends thereof protruding slightly above said platform walkway, drives connecting said rollers and said wheels rotatable on said conveyor to activate said rollers at progressively faster or slower speeds between ends thereof, said activated walkway serving for transveying load.

14. In a load transfer system having a train of platform cars underrunning transveyors having means of transferring load therebetween automatically, the improvement of structural coamings having continuous lower wearing edges positioned closely over lengthwise edges of said car platforms, and guiding rails for said train, comprising pairs of parallel wearing edges at different elevations, thereby forming a three dimensional confining structure guidingly retaining said train within defined limits of lateral and vertical clearance.

15. In a system of continuous rapid transit and load transfer comprising an endless, flexible train of platform cars forming a pair of parallel sections looped at the ends thereof, said train having means of uncoupling said cars to sever said train into sections and connectors engageable by couplers of approaching cars, the improvement residing in a pair of parallel tracks looped at the ends thereof, said endless train covering said tracks, pairs of loop tracks intermediate the length of said parallel tracks, looped and directed in opposite directions with a switch rail for each of said loop tracks and means of opening and closing said switch rails for rerouting sections of said train.

16. In a load transfer system, a train of platform cars, means of moving said train at incline with cars upright, and at normal grades between a stationary platform and a conveyor at different elevations, load transfer devices overlying said train and said conveyor and means of transferring load automatically between said platform and said train and between said train and said conveyor at or near the speeds of said train and of said conveyor respectively and of varying speeds of load gradually between said speeds.

17. A high speed escalator comprising a train of platform cars, means of moving said train in a route of inclines between normal grades at different floor elevations, rails on said inclines guiding said platform cars upright, loading and unloading transveyors in succession, aligned in a transfer lane and overlying a part of the greater width of said platform cars, and means of transferring load automatically at gradually varying speeds on said transveyors and onto and off said train between successive floors in the transfer lane, a transport lane spaced laterally of the transveyors, effecting express transit of load at the speed of the train between loading and unloading transveyors at any floors as selected.

18. A system of transportation including a flexible, endless train of platform cars interconnected into a balanced system of parallel train sections looped at the ends thereof, a series of drives and means of moving each of said cars in succession on normal grades and upright on inclines between floors at different elevation, the improvement of loading and unloading transveyors at said floors and at other transfer points in said route, overlying a transfer lane in part of the greater width of said platform cars and having means of transferring load thereon at gradually varying speeds and onto and off said train at the speed thereof and a continuous, endless transport lane spaced laterally of said transveyors, accommodating load in the endless length thereof serving continuous, express transit at the full speed of said train between any selected loading and unloading transveyors.

19. In a system of transportation and load transfer including a flexible train of interconnected platform cars having resiliently yielding connectors, the improvement of a series of drive units spaced along a route for moving said train and arranged operatively on the same side of said train, each of said drive units having a drive member activated thereby and a controllable pressure applying device, each of said drive members operative frictionally under adjustable pressure applied to each of said resiliently yielding platform cars in succession and said series of drive units operative simultaneously at substantially the same speed serving to move said train as a unit.

20. In a load transfer system, speed varying loading and unloading transfer devices communicative with transfer platforms in a transportation route, a transport medium having an endless conveying surface underrunning said transfer devices and means of transferring load automatically in the direction of movement on said transfer devices and, in continuous succession, onto and off said conveying surface at or near the speed thereof, the improvement of a series of rider guides movable on said transfer devices and on portions of the conveying surface between said devices, serving to guide load to and from said conveying surface, said rider guides movable also along said transfer platforms at the speed of said transfer devices at said platforms as pace setting means of guiding passengers and other load on and off said platforms at said speed, and auxiliary transveyors positioned at said transfer platforms over said rider guides having means of transferring load thereon automatically, onto and off said rider guides at or near the speed thereof.

References Cited in the file of this patent

UNITED STATES PATENTS

| | | |
|---|---|---|
| 1,480,635 | Putnam | Jan. 15, 1924 |
| 2,128,492 | Mena | Aug. 30, 1938 |
| 2,201,017 | Wehr | May 14, 1940 |
| 2,351,002 | Burton | June 13, 1944 |
| 2,756,686 | Kendall et al. | July 31, 1956 |
| 2,802,427 | Da Costa | Aug. 13, 1957 |
| 2,905,100 | Kendall et al. | Sept. 22, 1959 |
| 2,936,873 | Seidman | May 17, 1960 |
| 2,947,263 | Vidman | Aug. 2, 1960 |
| 2,954,744 | Bonner | Oct. 4, 1960 |